United States Patent [19]

Kitano

[11] Patent Number: 4,831,981
[45] Date of Patent: May 23, 1989

[54] SEALING STRUCTURE AROUND INTERCOOLER

[75] Inventor: Masaru Kitano, Hadano, Japan

[73] Assignee: Nissan Motor Co., Ltd., Yokohama, Japan

[21] Appl. No.: 224,687

[22] Filed: Jul. 27, 1988

[30] Foreign Application Priority Data

Jul. 27, 1987 [JP] Japan .................................. 62-187277

[51] Int. Cl.⁴ ............................................. B60K 13/02
[52] U.S. Cl. ................................ 123/198 E; 123/563; 60/599; 180/68.3
[58] Field of Search ........................... 123/198 E, 563; 180/69.24, 68.3; 60/599

[56] References Cited

U.S. PATENT DOCUMENTS

| | | | |
|---|---|---|---|
| 3,481,119 | 12/1969 | Mckinlay | 180/68.3 X |
| 4,169,436 | 10/1979 | Welch et al. | 60/599 X |
| 4,566,407 | 1/1986 | Peter | 123/563 X |
| 4,690,204 | 9/1987 | Reichel et al. | 180/68.3 X |
| 4,702,079 | 10/1987 | Saito et al. | 60/599 |
| 4,736,727 | 4/1988 | Williams | 123/563 |

FOREIGN PATENT DOCUMENTS 1067147  5/1967  United Kingdom .

Primary Examiner—Tony M. Argenbright
Assistant Examiner—Eric R. Carlberg
Attorney, Agent, or Firm—Foley & Lardner, Schwartz, Jeffery, Schwaab, Mack, Blumenthal & Evans

[57] ABSTRACT

A sealing structure around an intercooler arranged in an engine room of an automobile, in which an intercooler cover covers surroundings of the intercooler, and an annular sealing member is mounted to an engine hood for making resilient and tight contact with the intercooler cover to seal a peripheral portion of an air inlet of the engine hood and the intercooler cover when the engine hood is closed.

6 Claims, 2 Drawing Sheets

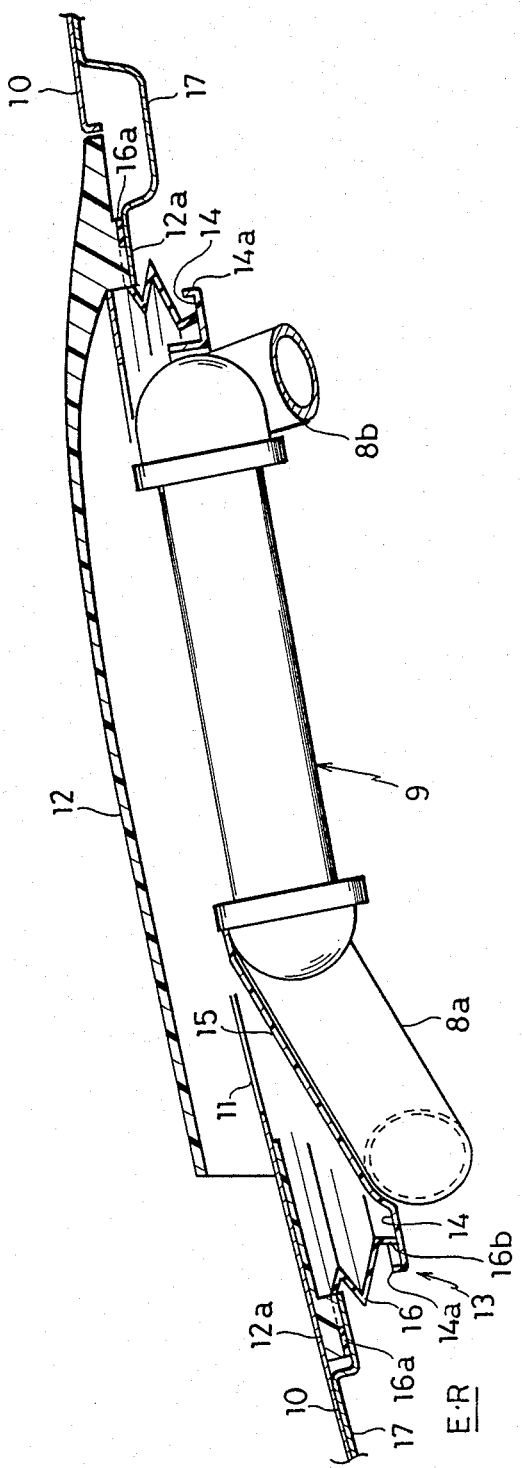

SEALING STRUCTURE AROUND INTERCOOLER

BACKGROUND OF THE INVENTION

1. Field of the Invention

The present invention relates to a sealing structure around an intercooler arranged in an engine room of an automobile.

2. Description of the Prior Art

In a conventional automobile having an engine cooperated with a turbo charger, as shown in FIG. 1, an intercooler 20 interposed in an air intake duct is arranged close to an engine hood 21, and the engine hood 21 is formed with an air inlet 22 and an air scoop 23 for covering the air inlet 22 right above the intercooler 20 in order to positively introduce the outside air to the intercooler 20 in an engine room. The engine hood 21 is also provided with an annular sealing member 24, which is made of a resilient material such as rubber, on the internal surface around the air inlet 22. The annular sealing member 24 resiliently and tightly contacts an upper peripheral surface of the intercooler 20 to seal the peripheral portion of the air inlet 22 and the upper peripheral surface of the intercooler 20 when the engine hood 21 is closed, and hence the outside air introduced into the engine room through the air inlet 22 is entirely fed to the intercooler 20 by virtue of the annular sealing member 24, resulting in a performance of a heat exchange with a good efficiency in the intercooler 20. A similar embodiment to this sealing structure around the intercooler is disclosed in the British Patent Publication No. 1,067,147.

However, in this case, a space for mounting the sealing member 24 between the engine hood 21 and the intercooler 20 is required, and accordingly the height of the engine hood 21 above the ground is necessarily raised. This restricts a constructive possibility of an automobile designing, and may often bring about poor visibility to a driver and low aerodynamic characteristics.

SUMMARY OF THE INVENTION

Accordingly, it is an object of the present invention to provide a sealing structure around an intercooler arranged in an engine room of an automobile, free from the aforementioned disadvantages and defects of the prior art, which is capable of reducing a height of an engine hood above the ground as low as possible, improving visibility and aerodynamic characteristics and performing a good air intake efficiency for the intercooler.

In accordance with one aspect of the invention, there is provided a sealing structure around an intercooler arranged in an engine room, comprising an intercooler cover for covering surroundings of the intercooler, and an annular sealing member mounted to an engine hood, for making resilient and tight contact with the intercooler cover to seal a peripheral portion of an air inlet of the engine hood and the intercooler cover when the engine hood is closed.

BRIEF DESCRIPTION OF THE DRAWINGS

FIG. 3 is a fragmentary longitudinal cross sectional view of the engine room including the sealing structure around the intercooler of in FIG. 2.

DESCRIPTION OF THE PREFERRED EMBODIMENT

Figure 1:
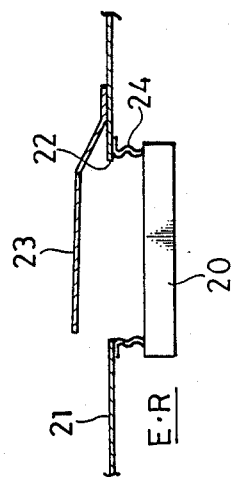
FIG. 1 is a fragmentary longitudinal cross sectional view of a conventional engine room of an automobile, containing an intercooler.
Figure 2:
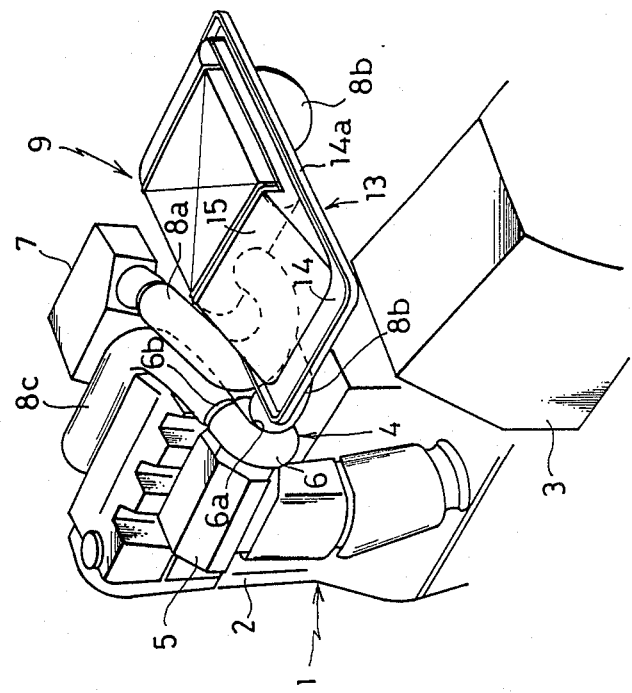
FIG. 2 is a fragmentary perspective view of an engine room of an automobile, containing an engine body, an intercooler cooperated therewith and a sealing structure around the intercooler according to the present invention.

Referring now to the drawings, wherein like reference characters denote like or corresponding parts, there is shown in FIGS. 1 to 3 one embodiment of a sealing structure around an intercooler arranged in an engine room of an automobile according to the present invention.

In the drawings, an engine 1 comprises an engine body 2 and a transmission gearbox 3 connected thereto. The engine body 2 includes a turbo charger 4 coupled to an exhaust pipe. The turbo charger 4 comprises a turbine 5 driven by an exhaust gas discharged by the engine body 2, and a compressor 6 driven by the turbine 5. An air intake duct 8 comprises a first duct member 8a, a second duct member 8b and a third duct member 8c. An air cleaner 7 for cleaning the introduced outside air is coupled to the first duct member 8a. The compressor 6 having an inlet 6a and an outlet 6b is interposed between the second and third duct members 8b and 8c, that is, the inlet 6a and outlet 6b of the compressor 6 are connected to the second and third duct members 8b and 8c, respectively. An intercooler 9 having a heat exchange portion for cooling the air introduced therein through the air cleaner 7 is interposed between the first and second duct members 8a and 8b. The second duct member 8b connects the intercooler 9 to the compressor 6, and the third duct member 8c links the compressor 6 to an intake manifold (not shown).

As clearly shown in FIG. 3, the intercooler 9 is arranged in the engine room E.R in close vicinity to an engine hood 10. The engine hood 10 is provided with an air inlet 11 right above the intercooler 9 and an air scoop 12 having an annular base flange 12a, which is made of a synthetic resin material or the like, for introducing the outside air to the intercooler 9 through the air inlet 11, the air scoop 12 covering the air inlet 11 on its rear, right and left sides. The annular base flange 12a of the air scoop 12 is secured to the internal surface of the engine hood 10 in its air inlet portion by using a food inner member 17 attached to the internal surface of the engine hood 10, as shown in FIG. 3. The surroundings such as the front end portion, the rear end portion, the right side portion and left side portion of the intercooler 9 is covered by an intercooler cover 13 which is mounted to the intercooler 9 in a proper conventional manner using bolts and/or adhesive, or the like, and is usually made of a synthetic resin material or the like.

Figure 4:
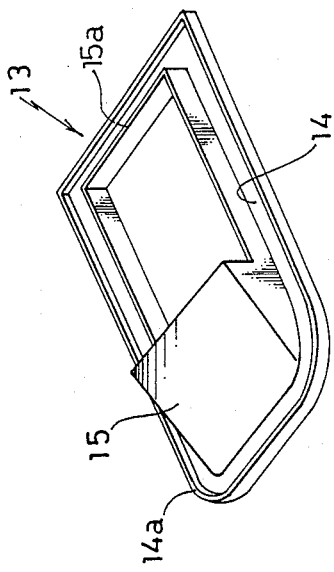
FIG. 4 is a perspective view of an intercooler cover shown in FIGS. 2 and 3.

As shown in FIG. 4, the intercooler cover 13 includes an annular seat portion 14 positioned in its lower periphery, for covering the circumference such as the right and left side portions and the rear end portion of the intercooler 9 and a slant hood portion 15 integrally connected to the front part of the seat portion 14, for covering the upper side of the first duct member 8a of the air intake duct 8, positioned in the front end portion of the intercooler 9. The seat portion 14 has a substantially annular shape corresponding to the peripheral portion of the air inlet 11 of the engine hood 11, and the hood portion 15 is inclined corresponding to the upper side of the first duct member 8a, as shown in FIG. 3. The intercooler cover 13 also includes an outer peripheral wall 14a integrally connected to the outer periphery of the seat portion 14 along the same, and an inner peripheral wall 15a integrally connected to the inner peripheries of the two sides and rear end of the seat portion 14 and both the sides of the slant hood portion 15 along the same. The outer peripheral wall 14a extends upwards in a certain height, and the inner peripheral wall 15a also extends upwards in a certain height except the portions contacting the slant hood portion 15. The height of the inner peripheral wall 15a is somewhat larger than that of the outer peripheral wall 14a in this embodiment. The slant hood portion 15 and the inner peripheral wall 15a of the intercooler cover 13 tightly contact the intercooler 9 so as to seal the same.

The engine hood 10 is also provided with an annular sealing member 16 having an upper flange portion 16a and a lower end portion 16b, which is made of a resilient material such as rubber, and is formed in a bellows-like shape, on the lower surface of the peripheral portion of the air inlet 11, that is, the upper flange portion 16a of the annular sealing member 16 is secured to the bottom surface of the annular base flange 12a of the air scoop 12, as shown in FIG. 3. When the engine hood 10 is closed, the lower end portion 16b of the annular sealing member 16 makes resilient and tight contact with the seat portion 14 of the intercooler cover 13 to seal the same, and the slipping of the lower end portion 16b of the annular sealing member 16 off the seat portion 14 of the intercooler cover 13 can be effectively prevented by the outer and inner peripheral walls 14a and 15a of the intercooler cover 13.

In the embodiment described above, when the engine hood 10 is closed, the lower end portion 16b of the sealing member 16 attached to the lower peripheral portion of the air inlet 11 of the engine hood 10 makes resilient and tight contact with the seat portion 14 of the intercooler cover 13 to exactly seal not only the peripheral portion of the air inlet 11 but also the peripheral portion of the intercooler 9. Therefore, the outside air caught by the air scoop 12 and introduced into the engine room through the air inlet 11 is wholly fed to the heat exchange portion of the intercooler 9 and is passed therethrough while the air introduced into the intercooler 9 via the air cleaner 7 is positively cooled by the outside air separately introduced to the heat exchange portion of the intercooler 9 through the air scoop 12 and the air inlet 11. Therefore, the good air intake efficiency for the intercooler can be performed.

As described above, since the seat portion 14 is formed in the lower periphery of the intercooler cover 13 and is positioned in the lower level than that of the upper surface of the intercooler 9, the height of the engine hood 10 above the ground can be lowered so that the air inlet 11 of the engine hood 10 may be positioned in approximately the same level as the top of the intercooler 9 while the sufficient space for mounting the sealing member 16 can be readily ensured. Accordingly, the height of the engine hood 10 above the ground can be reduced as low as possible to improve the visibility, the aerodynamic characteristics and so forth without limiting the constructive possibility of the automobile designing.

Further, according to the present invention, the slant angle of the intercooler 9 may be increased so that the rear end portion of the intercooler 9 may be further raised beyond the air inlet 11 within the space covered by the air scoop 12 when the engine hood 10 is closed in order to readily pass the outside air caught by the air scoop 12 through the heat exchange portion of the intercooler 9. In this embodiment, the intercooler cover 13 may project upwards beyond the air inlet 11 of the engine hood 10. In this case, of course, the same advantages and effects as those obtained in the embodiment described above can be resulted.

It is readily understood from the above description that, even when the intercooler is arranged close to the engine hood, regardless of whether it is located under the air inlet or protrudes outside beyond the air inlet of the engine hood, the sufficient space for mounting the sealing member for sealing the peripheral portions of the air inlet and the intercooler can be ensured. Therefore, the height of the engine hood above the ground can be lowered as low as possible, with the result that the constructive requirements of the body of the automobile may be satisfied and the visibility and the aerodynamic characteristics may be improved.

What is claimed is:

1. A sealing structure around an intercooler arranged in an engine room, comprising:

an intercooler cover for covering surroundings of the intercooler; and an annular sealing member mounted to an engine hood, for making resilient and tight contact with the intercooler cover to seal a peripheral portion of an air inlet of the engine hood and the intercooler cover when the engine hood is closed.

2. The structure of claim 1, wherein the intercooler cover includes an annular seat portion positioned in a lower level than an upper surface of the intercooler, for covering the surroundings of the intercooler.

3. The structure of claim 2, wherein the intercooler cover also includes a hood portion connected to the seat portion, for partially covering an air intake duct member positioned around the intercooler.

4. The structure of claim 3, wherein the sealing member includes an upper flange portion and a lower end portion, the upper flange portion being mounted to a peripheral portion of the air inlet formed right above the intercooler, the lower end portion making resilient and tight contact with the seat portion of the intercooler cover when the engine hood is closed.

5. The structure of claim 4, wherein the intercooler cover also includes outer and inner peripheral walls connected to outer and inner peripheral portions of the annular seat portion, respectively, for preventing the lower end portion of the sealing member from slipping off the annular seat portion of the intercooler cover when the engine hood is closed.

6. The structure of claim 5, wherein the intercooler cover covers the surroundings of the intercooler in tight contact therewith for sealing the intercooler.

* * * * *